May 3, 1960 A. ENGQUIST 2,934,946
TORQUE WRENCHES
Filed Jan. 30, 1958 3 Sheets-Sheet 1

INVENTOR
ARNE ENGQUIST
By *Richard E. Harris*
ATTORNEY

May 3, 1960     A. ENGQUIST     2,934,946
TORQUE WRENCHES

Filed Jan. 30, 1958     3 Sheets-Sheet 3

INVENTOR
ARNE ENGQUIST
By *[signature]*
ATTORNEY

United States Patent Office 2,934,946
Patented May 3, 1960

2,934,946
TORQUE WRENCHES

Arne Engquist, Enkoping, Sweden, assignor to Aktiebolaget Bahco, Stockholm, Sweden, a corporation of Sweden Application January 30, 1958, Serial No. 712,212

Claims priority, application Sweden February 5, 1957

6 Claims. (Cl. 73—139)

The present invention relates to torque wrenches, and is more particularly concerned with an improvement in torque wrenches of the type in which the torque is transmitted over a gearing to a pointer and in which a pointer housing with dial is supported by a part which is connected to the torque wrench body but is relieved of torsional stresses. The object of this invention is to make possible in a simple manner such a calibration of the pointer that its turn exactly corresponds to the actual torque.

According to this invention, the above object is achieved by the provision of a calibration stud which is threadedly and adjustably affixed to the wrench body and actuates the pointer.

By adjusting said calibration stud gearing ratio may easily be varied so that the pointer obtains an exact calibration.

In one embodiment, the calibration stud may be provided with a transverse pin which engages a slot provided in the pointer which is pivotally mounted in the pointer housing.

To permit a more exact calibration, the calibration stud may be provided with two or more, e.g. four transverse pins projecting in different directions, so that the effective length of the calibration stud may be adjusted to a fraction of one turn.

Finally, the end of the calibration stud may be formed with a ball, which can be considered as comprising an infinite number of pins.

The accompanying drawing illustrates some embodiments of a torque wrench embodying the principles of this invention.

Figure 1:
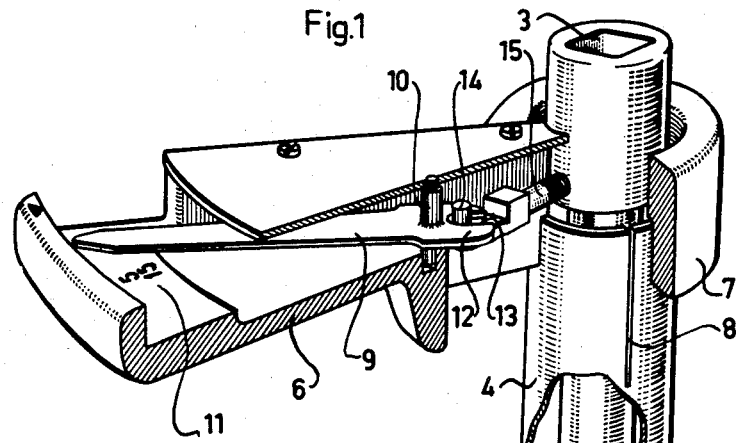
Figure 1 illustrates in perspective view and with parts broken away a torque wrench with the pointer in zero position.
Figure 2:
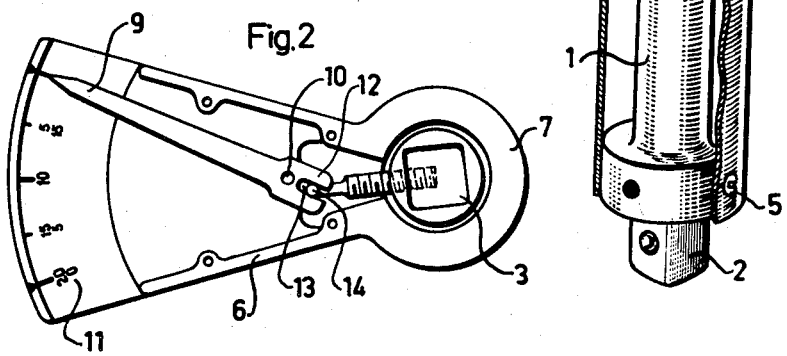
Figures 2 and 3 show the pointer in two different positions.
Figure 3:
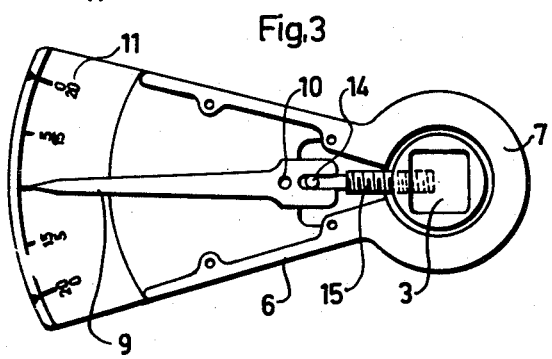
Figure 4:
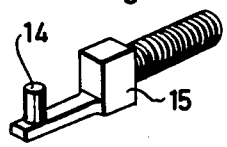
Figure 4 is a detail view showing an adjustable calibration stud.

Referring to Figures 1 to 3, the numeral 1 designates the wrench, which at the lower end thereof has a square head 2 adapted to engage e.g. a sleeve corresponding to a nut or a bolt head. At its upper end the wrench body 1 which is in the form of a rod is provided with a recess 3 in which a suitable tool can be inserted to turn the wrench. Surrounding the wrench body 1 is a sleeve 4 which is affixed only to the lower end of the wrench body 1 by means of screws 5 while the remainder of the sleeve 4 is free from the wrench body 1 so that it is not subjected to torsion when the wrench body 1 is imparted a torque. Surrounding the upper end of the sleeve 4 is a pointer housing 6 having a dial 11, said housing being attached to the sleeve 4 by means of a hub 7 which may be integral with the upper end of the sleeve 4 or slid around the sleeve with friction, for which purpose the sleeve may have longitudinal slots 8 so that the upper end of the sleeve may be compressed resiliently when the hub 7 of the pointer housing 6 is slid onto the sleeve.

In the pointer housing, the pointer 9 is mounted on a pivot 10, so that the front end of the pointer may be moved over the dial 11 provided in the pointer housing. The opposite end of the pointer extends past the pivot and this extension 12 is provided with a slot 13 into which projects a pin 14 affixed to the free end of a calibration stud 15 which is threadedly secured in the wrench body 1 subjected to torsion.

If, before the wrench body 1 is subjected to a torsional stress, the pointer housing 6 is attached to the sleeve in the position shown in Figures 1 and 2, in which the pointer 9 is zeroized on the dial 11, the pointer 9, when the wrench is turned clock-wise, will be moved an angular distance corresponding to the torsion of the wrench body 1, i.e. corresponding to the torque. On account of the relatively great length of the stud 15 and the relatively short distance of the pin 14 from the pivot 10 of the pointer, the pointer will be turned a relatively large angle for even a small torsion of the wrench body, so that the torque value will be clearly readable even for relatively small torques. Due to the provision of the slot 13 in the pointer it will also be possible, by turning the stud 15 half a turn or one or more turns in either direction, to adjust the pointer in a very simple manner, so that its turn will correspond exactly to the torque. This is a great advantage, because each wrench must be adjusted separately since it is impossible to manufacture all wrench bodies with exactly the same angle of torsion per torque unit.

In the embodiment of Figures 1 to 4, the calibration stud 15 is provided with a single transverse pin 14, wherefore the adjustment of the stud cannot be made more exactly than as corresponds to a rotation of half a turn. Even if the pitch of the thread of the stud 15 is small, this may be insufficient if a high degree of exactness is required.

Figure 5:
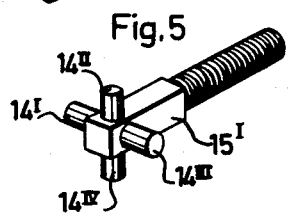
Figure 5 illustrates a modified form of the calibration stud.
Figure 6:
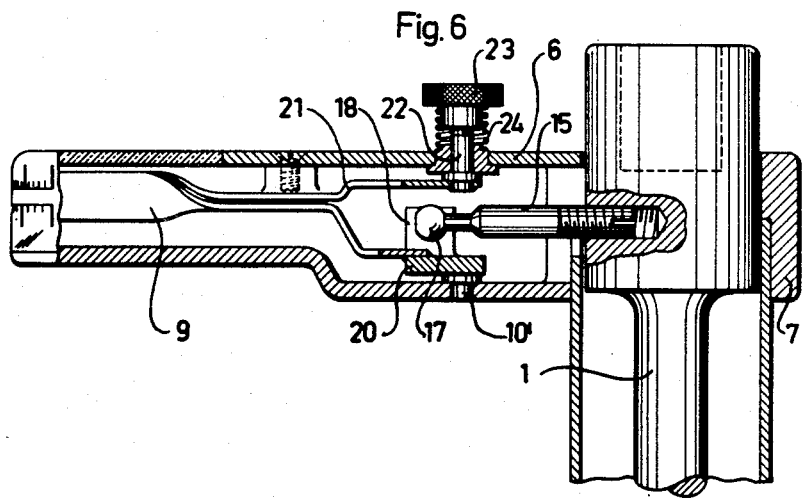
Figures 6 to 9 illustrate another embodiment of the torque wrench in vertical transverse section and in plan view respectively, the calibration stud in this embodiment having a ball instead of pins, this embodiment furthermore incorporating an auxiliary pointer.
Figure 7:
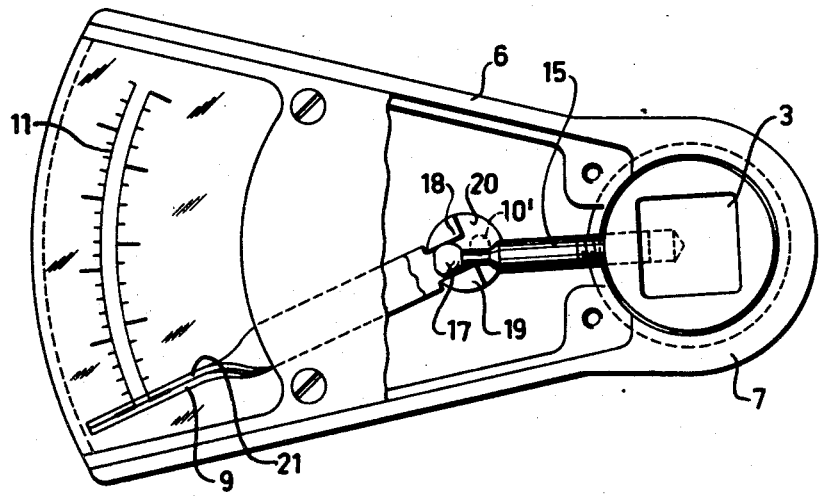
Figure 8:
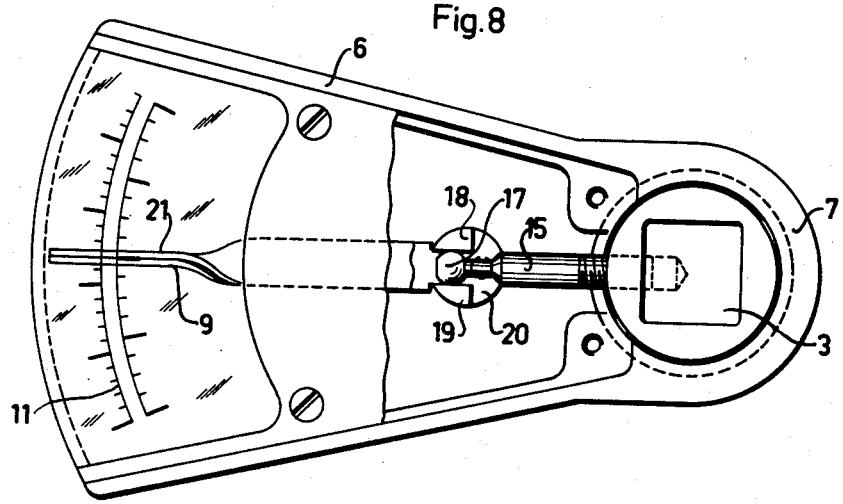
Figure 9:
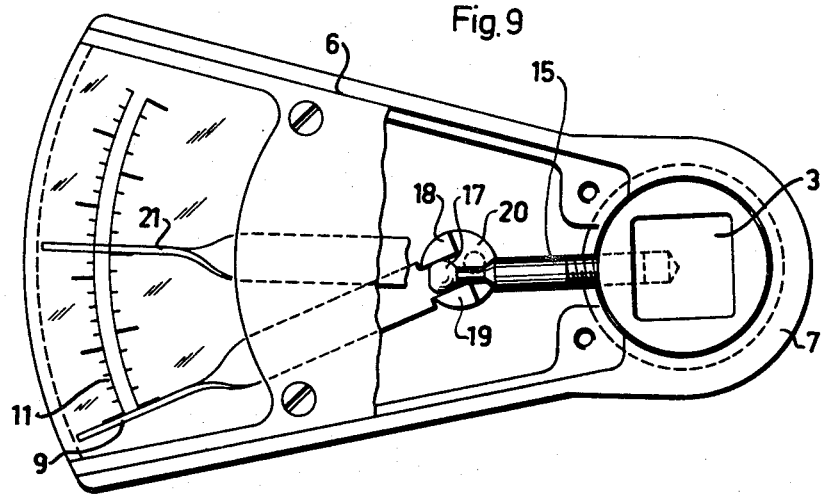

Figure 5 shows a calibration stud which permits a higher degree of exactness in the adjustment in that it has four transverse pins $14^I$, $14^{II}$, $14^{III}$ and $14^{IV}$. The adjustment of the stud 15' can in this case occur by a rotation of a quarter of a turn.

By the embodiments above described, a calibration sufficiently exact for most purposes may be obtained.

By replacing the pin or pins 14 on the calibration stud 15 by a ball 17 as shown in Figures 6 to 9, an absolutely exact calibration may be obtained. The ball 17 may be considered as comprising an infinite number of pins, so that any rotation of the calibration stud, at an angle which may be arbitrarily small, results in a corresponding adjustment of the gearing ratio between the wrench body 1 and the pointer 9. The ball 17 projects between two abutments 18, 19, which are provided on the pointer hub 20 rotatable on the pivot 10'.

To obtain a permanent reading of the torque with which e.g. a nut has been tightened, it is possible, as also shown in Figures 6 to 9, to provide a manually actuable auxiliary pointer 21 which, when the wrench is to be used, is turned to engage the pointer actuated by the wrench body when this is in its zero position, and is carried along by this pointer 9 when the wrench is used. When the tightening is completed and the wrench is removed the pointer 9 will immediately return to its zero position, while the auxiliary pointer 21 remains in the position corresponding to the torque used so that the torque used may be determined even after removal of the wrench. The auxiliary pointer 21 is pivotally mounted in the pointer housing 6 on a shaft 22 which is in alignment with the pivot 10' of the pointer 9 and may be turned manually by means of a knob 23 provided at the outer side of the pointer housing 6. In order to make sure that the auxiliary pointer 21 remains in the position corresponding to the angular position to which the pointer 9 has been moved, corresponding to the permissible torque, a helical spring 24 is provided between the pointer housing 6 and the knob 23 to impart a certain frictional resistance to the rotation of the auxiliary pointer 21.

I claim:

1. A torque measuring wrench, comprising a rod shaped torque member terminating on one end in a work-engaging element, a sleeve surrounding said torque member with clearance, one end of said sleeve being secured to said torque member near said work-engaging element whereby the other and free end of the sleeve participates only partially in a torsion imparted to the torque member, a support frame secured to the free end of the sleeve and bearing a calibrated scale, a pointer coacting with said scale and pivotally mounted on said support frame, an actuating stud secured to said torque member at the end thereof adjacent to said frame and engaging said pointer to turn the same corresponding to a relative rotation of the torque member and said free end of the sleeve, the position of said pointer in reference to the scale being indicative of the applied torque, and adjustable means for varying the effective length of the stud between the torque member and the point of engagement of the stud with the pointer.

2. A wrench according to claim 1 wherein said support frame comprises a housing laterally extending from said torque member and said sleeve, said pointer being pivotal in a plane parallel to the general plane of the housing.

3. A wrench according to claim 1 wherein said stud is secured to said torque member by an adjustable threaded connection and mounts a transversely protruding pin, and wherein said pointer is pivotal about an intermediate point of its length to form two arms, one arm being movable over said scale and the other including a longitudinally elongated slot engaged by said stud pin, said threaded connection and said stud-pointer connection constituting said adjustable means.

4. A wrench according to claim 3 wherein said stud mounts several circumferentially spaced transverse pins.

5. A wrench according to claim 1 wherein said stud is secured to the torque member by an adjustable threaded connection and terminates in a sphere, and wherein said pointer is provided with a longitudinally elongated slot engaged by said sphere, said threaded connection and said stud-pointer connection constituting said adjustable means.

6. A wrench according to claim 5 wherein the pivot point of said pointer is situated between said torque member and said slot.

References Cited in the file of this patent

UNITED STATES PATENTS

| | | |
|---|---|---|
| 1,632,067 | Hampton | June 4, 1927 |
| 1,945,456 | Wardenburg | Jan. 30, 1934 |
| 2,171,183 | Lamb | Aug. 29, 1939 |
| 2,374,217 | Larson et al. | Apr. 24, 1945 |
| 2,497,756 | Billeter | Feb. 14, 1950 |

FOREIGN PATENTS

| | | |
|---|---|---|
| 745,891 | Germany | Dec. 2, 1944 |